June 18, 1940.   E. G. JOHANSSON   2,205,202
METER MOUNTING
Filed July 20, 1938   2 Sheets-Sheet 1

WITNESSES:

INVENTOR
Ernest G. Johansson.
BY
ATTORNEY

June 18, 1940.　　　　E. G. JOHANSSON　　　　2,205,202
METER MOUNTING
Filed July 20, 1938　　　2 Sheets-Sheet 2

WITNESSES:

INVENTOR
Ernest G. Johansson.
BY
ATTORNEY

UNITED STATES PATENT OFFICE 2,205,202

METER MOUNTING

Ernest G. Johansson, Watertown, Mass., assignor to Westinghouse Electric & Manufacturing Company, East Pittsburgh, Pa., a corporation of Pennsylvania Application July 20, 1938, Serial No. 220,178

4 Claims. (Cl. 175—225)

The present invention is a modification of, and an improvement on, the construction disclosed in my copending application, Serial No. 194,839, filed March 9, 1938, and relates to a mounting for watthour meters or other electrical instrumentalities in which terminal contact members, such as blades, project from the casing thereof and, more particularly, to the mounting of such instrumentalities in connection with a box, trough, or other receptacle.

The detachable type of watthour meter housing is shown in Patent No. 1,969,499, issued August 7, 1934, to Bradshaw et al. One means for mounting such type of meter in connection with a box or trough is shown in Patent No. 2,118,587, issued May 24, 1938, to Bradshaw and Johansson. In such mounting, a terminal block is disposed in the base of the trough or receptacle and is provided with a conducting strap extending from a terminal on the block toward the opposite open side of the receptacle. A meter supporting and connecting device, frequently called a "ring-socket," is disposed across the open face of the receptacle and is provided with contact jaws for receiving the blades projecting from the meter casing; such jaws being mounted on insulating blocks suspended across the opening of the socket by means of a strap or cross-bar. Conductors extend from the jaws to a position adjacent to the free ends of the straps extending from the terminal block, and a releasable connecting means, accessible through an opening in the meter connection device, or ring-socket, controls the continuity of the circuit to the terminal jaws, and hence the energization of the meter and the circuit to the consumer's load.

In my copending application, Serial No. 194,839, above mentioned, a further improvement is disclosed with particular reference to the releasable connecting means, or disconnect, controlling the continuity of the circuit to and through the meter from the terminal block. As shown in such application, the conducting strap extends upwardly from the terminal block to confront the conductor depending from the terminal jaw. In order to take care of various types of installations, a modification of this construction has been evolved, resulting in the present invention.

The type of meter to be mounted in installations of the above character, at least of the single-phase type, is now so standardized that the flat sides of the contact blades projecting from the base thereof are in vertical planes when the meter is in operative position. Also, the ring socket is usually so mounted on the cover of the box or receptacle that the cross-bar upon which the contact jaws are supported extends vertically or transversely of the horizontal axis of the box or trough. However, in some instances, it may be desired to have the cross bar extend horizontally, and it may be desired to have the major axis of the box or trough extend vertically.

Under all these various mounting conditions, the contact jaws must be disposed to have the slot extend vertically to receive the meter terminal blades, and the conductor extending from the jaw must be in position to confront the end of the conducting strap extending from the terminal block in the base of the box or trough. Since such conductor extends from a jaw in the direction of the jaw slot, it will be either in such confronting position or at right angles to it, depending upon the type of installation.

In order to take care of these situations and at the same time avoid the complications and expense of manufacturing several varieties of ring socket and boxes having terminal blocks in various positions, the present invention has been devised having as an object the provision of a standard meter connection device or ring-socket which may be used on either horizontally or vertically extending boxes or troughs with the cross bar of the socket extending either vertically or horizontally and at the same time permitting a standard terminal block construction in the box or trough.

Other objects of the invention will be apparent from the following description and from the accompanying drawings, in which Figure 1 is a view in section, with parts broken away taken on the major axis of a rectangular receptacle constituting a meter mounting embodying the present invention;

Figure 1:
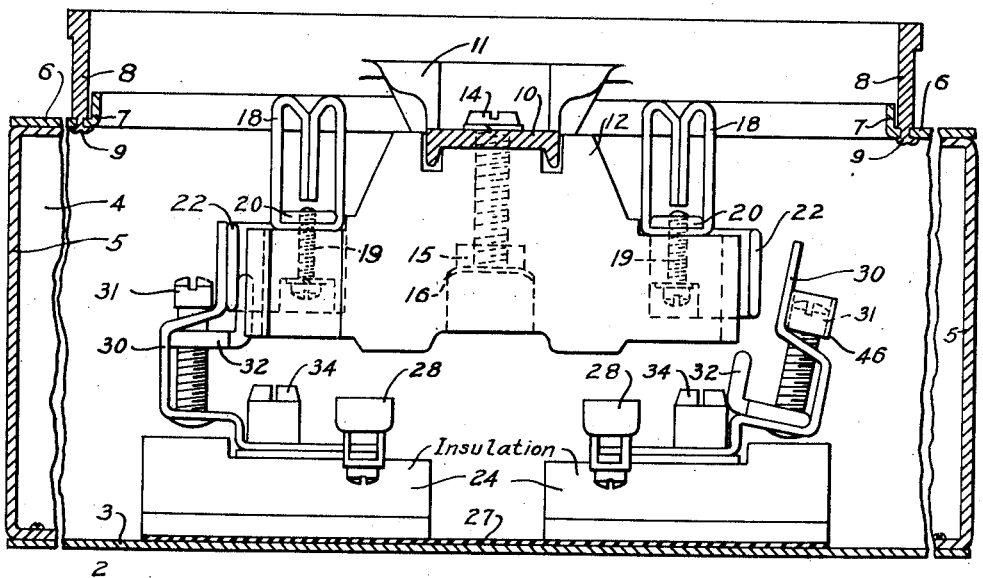
Figure 3:
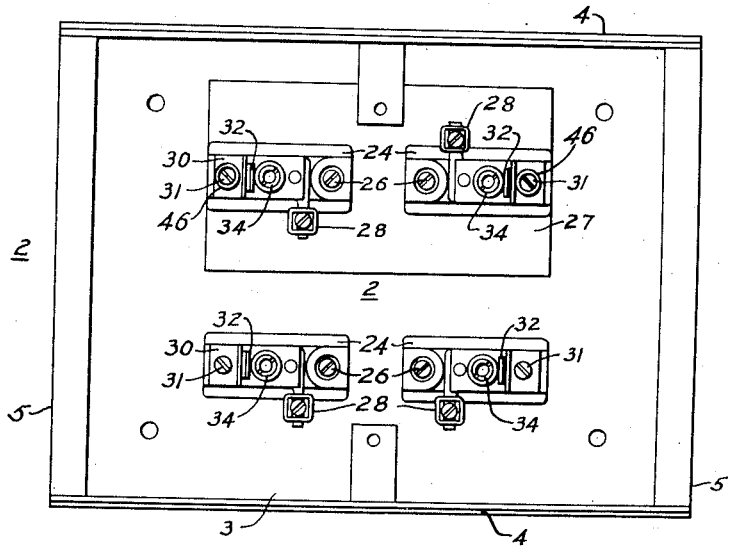
Fig. 3 is a plan view of the receptacle, with cover removed, shown in Fig. 1.

Referring to Figure 1, which corresponds to a view taken on the major axis of Fig. 3, a rectangular receptacle 2, usually of sheet metal, comprises bottom 3, side walls 4 (only one of which is shown), end walls 5, and a substantially open top closed by a cover 6 removably secured thereto. The cover 6 is provided with a circular upturned flange 7 proportioned to fit within a circular member or ring 8, riveted thereto as at 9, constituting a part of the meter connection device or ring-socket of the present invention. The receptacle 2 may be a box, as shown in Fig. 3, for mounting a single watthour meter or other instrumentality, or it may be part of a trough for mounting a plurality of such meters or instrumentalities in side-by-side relation for a gang installation. The bottom 3 of the receptacle is to be secured to a support in a vertical position by screws, as indicated in Fig. 3.

The ring 8 may be formed as desired, but a preferred type, as illustrated, is a die-casting having formed integral therewith a cross-arm or bar 10 extending diametrically across the ring joining it at opposite sides by means of portions 11. Quite obviously the ring may be made an integral part of the cover 6, if desired, by rolling up the flange similar to flange 7, to the desired shape or may be other than a die-casting.

Figure 4:
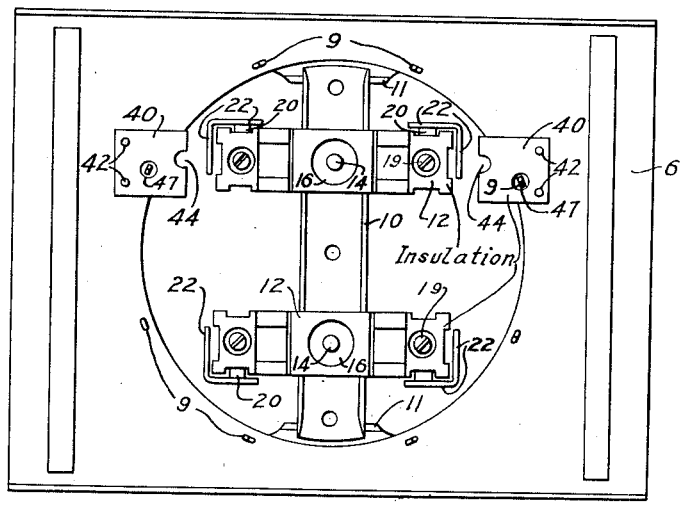
Fig. 4 is a bottom plan view of a cover for such receptacle.

A pair of insulating blocks 12, shown in Figs. 1 and 4, are suitably secured to the cross-bar 10 by means of a bolt 14 extending through the cross-arm and an aperture in the block 12 into threaded engagement with a nut 15 which is retained in a recess in the block against rotation by means of a spring disc 16.

The blocks 12 each have portions extending on opposite sides of the cross-arm 10 and adjacent the extremities of such portions, terminal jaws 18 are secured as by a machine screw 19 extending upwardly through the block, through an aperture in the base of the jaw, and into threaded engagement with a conducting strap 20.

In the construction shown, when the ring socket is mounted in position to receive a meter, the cross-bar 10 as well as the slots in the jaws 18 extend vertically. If it is desired to have the cross-bar extend horizontally, it is merely necessary to back off screws 19 and rotate the jaws 90° to bring the slots thereof into the required vertical position.

Figure 2:
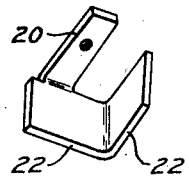
Fig. 2 is a view in perspective of an element shown in Fig. 1 contributing to the effectiveness of the invention.

The conducting strap 20 extends in the direction of the jaw slot beyond the base of the jaw and terminates in angularly related portions 22, one portion being formed to extend downwardly to one side of the block 12 and the other portion to extend around the end of the block. Accordingly, the angular portions 22 are at right angles to each other, one being parallel and the other at right angles to the line defined by the jaw slot. The shape of the strap 20 and portions 22 is more clearly shown in Figs. 2 and 4.

Terminal blocks 24 of insulating material are secured in the base of the receptacle 2 by screws 26 (Fig. 3) and may be spaced therefrom as by sheet insulating material 27. Referring to Figs. 3 and 4, it will be noted that the terminal blocks 24 and the conductors 20, 22 are disposed symmetrically about the longitudinal and lateral center lines of the receptacle 2, to define a square; elements associated with each terminal jaw and block being equally spaced from corresponding elements associated with adjacent jaws and blocks.

Each of the blocks is provided with a clamp 28 for receiving the conductors or buses of the circuit with which the meter is to be associated. It is intended that the terminal clamps 28, corresponding to one pair of the jaws 18, will receive the line conductors of the circuit and a second pair associated with the block and jaws not shown in Fig. 1, will be connected to the load conductors. When a watthour meter, for example, is supported with this construction, circuits will then be completed through the current and potential windings from the line circuit to the load circuit in a usual manner.

The terminal clamps 28 are preferably of the type disclosed in Patent No. 2,088,481, issued July 27, 1937, and each is electrically connected to a conducting strap 30 which extends from the terminal clamp toward the opposite side of the receptacle 2 and terminates in a position to confront the angular portion 22 of the bracket associated with a jaw 18. As shown in the drawings, each of the straps 30 is provided with a disconnect device comprising a screw 31 threaded through offset portions of the strap and carrying with it a clamping member 32 which in its upper position lies behind the angular portion 22, or between such portion and the wall of a recess formed in the insulating block 12 as shown to the left in Fig. 1. Due to slight resiliency in the strap 30 and the configuration thereof, tightening down on screw 31 effectively clamps the angular portion 22 between the free end of the strap 30 and the upwardly extending portion of the clamping member 32. When the member 32 is moved downwardly by rotating screw 31 in the opposite direction, the free end of the strap 30 resiliently springs away from the member 22, and upon movement of the member 32 to its lowest position (at right in Fig. 1), a portion thereof engages the tapered head of a stud nut 34 to force the free end of the strap 30 positively and further away from the angular portion 22 associated with the jaw. A more detailed description of the operation of this disconnect device will be found in my copending application Serial No. 194,339, above referred to. In such construction, a stud having a tapered head is not employed, however the tapering is advantageous in that less friction results when the taper is engaged by the member 32 when such member is at its lower position, and less strain is imposed on the parts.

In the type of installation illustrated in Fig. 1, the connection between a terminal strap and the corresponding conductor extending from the jaw is made at the end of the insulating block 12. In many cases, however, it is desired to make such connection at one side of the block 12 as in my copending application above referred to, that is, in a position at right angles to that shown in Fig. 1 hereof, depending upon whether the box is to extend horizontally or vertically and whether the cross-bar 10 is to extend horizontally or vertically. In order to solve this problem, in accordance with the present invention the conducting portion 22 of the conductor 20 associated with the jaw is of angular conformation extending across the end of block 12 and one side thereof so that one or the other of the portions 22 will always be in position to cooperate with the end of a strap 30; the four straps 30 and jaws 18 being symmetrically disposed to define a square, and the portions 22 being equally spaced from the axis of the screw 19 disposed centrally of each jaw 18.

It may be desirable to extend the angular portion 22 around another side of the block, or the other end of the jaw 18, but in practice it has been found that a provision for the end of the block and one side thereof is sufficient; it being generally desirable to keep the space between blocks clear for the reception of circuit conductors.

The construction described materially increases the flexibility of this type of installation while retaining a standardized construction and standard arrangement of parts, and is effective to take care of substantially all of the various installation conditions encountered.

It should also be noted that four separate terminal blocks 24 are employed rather than a single block, or a pair of blocks each accommodating two terminal clamps. Usually such blocks are of porcelain and having them individual decreases the cost of replacement in the event of breakage. Also, individual blocks result in more space in the base of the receptacle for wiring, installation of grounding terminals, etc.

Another feature of the invention is the provision of greater safety to the electrician in manipulating the disconnect screw 31 when the circuit is energized; it being appreciated that the insertion of a screw-driver past the usually grounded ring 8 into contact with the disconnect screw 31 is hazardous. It is proposed to secure a relatively thin strip or plate 40 (Fig. 4) of sheet insulation, such as a molded phenolic product to the cover 6, as by rivets 42, in such position that one edge thereof projects into the cover opening. A notch 44 is formed in the plate 40 in such position that the head of the screw 31 is exposed therethrough and serves as a guide for a screw-driver. As a further precaution, a small ferrule 46 (Fig. 1) which may be of brass, encloses the head of the screw to prevent the tip of a screw-driver slipping off into engagement with other live parts. Only one such ferrule 46 is shown in Fig. 1, and only two plates 40 are shown in Fig. 4, but it is contemplated that all of the screws 31 may be so equipped and guarded, or a desired number of them. Also, the plate 40 may be provided with an aperture 47 encircling one of the rivet ends 9, thereby permitting the plate to lie flat against the receptacle cover 6 and be further braced against lateral movement.

Obviously, modifications may be made in the construction shown without departing from the spirit and scope of the invention and it is intended that no limitations shall be placed upon the invention except as imposed by the appended claims.

I claim as my invention:

1. In a meter mounting, a receptacle having an open side and a terminal block secured therein, terminal clamps on said block and conductor straps secured to said clamps having free ends accessible through said open side, a meter connection device and means for supporting it across said open side in either of two positions parallel to the plane of said open side, contact jaws secured to said connection device and rigid conducting members secured thereto having free ends extending respectively adjacent to the free ends of said straps and being so formed that a portion of each member confronts its respective strap free end in both positions of the connection device, and means for clamping together the free ends of said conducting members and the straps adjacent thereto.

2. In a mounting for an electrical instrumentality of the type having terminal contacts projecting from the casing thereof, a receptacle having an opening in one side thereof, a terminal block in fixed position in said receptacle and a conducting strap extending therefrom toward said opening, a mounting device having a contact thereon for engaging a terminal contact of said electrical instrumentality, means for securing said mounting device at said opening in either of two positions at right angles to each other parallel to the plane defined by the opening, a rigid conducting member secured to said jaw having a free end so formed that a portion of it will confront the free end of said conducting strap in both positions of the mounting device.

3. In an installation for an electrical instrument of the type having terminal blades projecting from the casing thereof, a receptacle having an opening in a side thereof, a terminal block mounted within said receptacle having a clamp thereon for receiving a circuit conductor and a conducting member secured thereto extending toward said opening, a connection device supported across said opening including a block of insulating material having a terminal jaw secured thereon in a position to receive the terminal blade of an electrical instrument, a rigid conducting member secured to said jaw and extending toward the free end of said first mentioned conducting member, and means for selectively clamping the ends of said conducting members together at either of at least two adjacent sides of said jaw while said jaw remains in said position.

4. In an installation for an electrical instrument of the type having terminal blades projecting from the casing thereof, a receptacle having an opening in a side thereof, a terminal block mounted within said receptacle having a clamp thereon for receiving a circuit conductor and a conducting strap secured thereto in fixed position and extending toward said opening, a connection device supported across said opening in either of two positions selectively, a terminal jaw secured to said connection device for receiving the terminal blade of an electrical instrument, a rigid conductor secured at one end to said jaw and extending from one side thereof into the receptacle and around an adjacent side of the jaw, and means for clamping the free end of said strap to said conductor extending from said jaw at either of said adjacent sides of the jaw, selectively.

ERNEST G. JOHANSSON.